Patented Jan. 13, 1948

2,434,389

UNITED STATES PATENT OFFICE 2,434,389

REMOVAL OF FINE DUST FROM BAUXITE

Ferdinand W. Breth and Anthony Kinsel, Petrolia, Pa., assignors to L. Sonneborn Sons, Inc., New York, N. Y., a corporation of Delaware No Drawing. Original application March 14, 1939, Serial No. 261,790. Divided and this application November 9, 1943, Serial No. 509,630

4 Claims. (Cl. 23—142)

This invention relates to adsorbent bauxite and to a method for preparing adsorbent bauxite of improved characteristics.

The present application is a division of our application Serial No. 261,790, filed March 14, 1939, entitled Bauxite adsorbents and processes of making and using same.

The conventional liquid phase refining treatment of petroleum hydrocarbons including residue and distillates, such as kerosene, gasoline, lubricating oils, transformer oils, medicinal oils, petrolatum, paraffin, etc., generally involves the use of solid adsorbent materials to improve the color of such products or to effect a partial desulphurization of the same. For this purpose the hydrocarbons are brought into contact with the adsorbent material. This may be accomplished in various ways, such as by admixing the adsorbent material in a finely divided form with the hydrocarbon to be refined and thereafter separating the mixture by means of a filter press which retains the adsorbent material, which process is commonly referred to as "contacting," or, alternatively, by passing the hydrocarbon material through a bed of the adsorbent from which it issues in a decolorized condition. The latter procedure is commonly referred to as "percolation." If the hydrocarbon to be refined is solid or semi-solid at ordinary temperatures, such as paraffin, petrolatum, and like substances, it is contacted with the adsorbent material, preferably in molten condition or dissolved in a suitable solvent. The term "decolorized" or such similar expression as used in the industry and in this application does not necessarily connote the removal of visible coloring matter only. It also connotes improvement of the original color by virtue of removal of colorless compounds which are converted to visible coloring matter by the polymerizing action of the adsorbent material. The adsorbent material principally used in the industry in the percolation method is generally a clay of the fuller's earth type which has been specially processed to develop its adsorbent characteristics; for example, it may be subjected to heat or acid treatment or both.

Percolation through bauxite has been used to some extent for the refining of some petroleum hydrocarbons. Bauxite, however, as it is obtained from the mine, possesses only very weak adsorbent properties, and acquires enhanced adsorbent properties only after heat treatment which is generally referred to in the industry as the activation of the bauxite. Before being subjected to heat treatment, the raw bauxite is usually ground and screened to produce material having a particle size predominantly between 20 and 80 mesh, bauxite within this range of particle size having been found particularly adapted to the treatment of oil by the percolation technique. Particles coarser than 20 mesh, as a general rule, do not exhibit the high adsorptive efficiency necessary for successful percolation, while particles smaller than 80 mesh, though possessing adsorptive characteristics to a high degree, will give unsatisfactory yields as a result of increased soakage, and furthermore will result in the formation of filter beds so dense that the filtration rate is materially impaired.

The activation of the bauxite is usually carried out by heating the same to temperatures of the order of from 600 to 1600° F. Such treatment imparts to the bauxite enhanced adsorptive properties which may be regenerated after the bauxite becomes exhausted during use, by again roasting same at temperatures of the order of the magnitude aforesaid.

During the activation of bauxite by heat treatment at temperatures between 600 and 1600° F., a general diminution in size of the particles subjected to the treatment occurs and an appreciable amount of particles finer than 80 mesh is produced. We have found that, although most of these particles below 80 mesh, which particles for purpose of convenience may be termed "bauxite dust," are removable by mechanical means, viz., screen sifting and the like, comparatively large amounts are retained by the coarser bauxite particles and cannot be removed by such means. We have discovered that this phenomenon is due to the fact that an activated bauxite possesses a pronounced power of attraction for its own dust, and will usually exercise this power of attraction to the extent of causing retention of up to 10 per cent of bauxite dust (calculated on the total amount of bauxite present after separation of the conventionally removable dust). We have found that the adsorptive efficiency of activated bauxite of a particle size between 20 and 80 mesh for the refining of hydrocarbon products is greatly impaired and materially reduced by reason of these dust particles which tenaciously adhere to the particles of larger size despite the fact that the dust particles, as such, inherently possess an adsorptive efficiency which is superior to that of bauxite particles of coarser mesh size. The adsorptive efficiency of bauxite particles of a size between 20 and 80 mesh progressively decreases with the presence of increasing amounts of particles smaller than 80 mesh until a minimum is reached at a point where the dust content of the bauxite reaches approximately 10 per cent. With higher dust contents the adsorptive efficiency again commences to increase as the amount of dust present in excess of approximately 10 per cent commences to add its inherent adsorptive efficiency to that of the coarser bauxite particles, the efficiency of which is impaired by reason of the first 10 per cent dust found to be tenaciously adhering to the coarser particles. With a dust content of approximately 25 per cent, the adsorptive efficiency of the dust containing bauxite will have again reached the adsorptive efficiency of substantially completely dedusted bauxite, and will further increase with increasing dust content. Though from the standpoint of adsorptive efficiency the presence of large amounts of dust may be desirable, we have found that dust will interfere with the successful percolation treatment to such an extent that the removal of the dust present in excess of 15 and preferably in excess of 10 per cent is a prerequisite to successful bauxite filtration with regard to filtration yield and rate of flow of the hydrocarbon material through the filter bed.

In the following table, the adsorptive efficiency of a bauxite of a particle size between 20 and 80 mesh and containing varying amounts of dust, is shown:

TABLE I

*Adsorptive efficiency of bauxite containing varying amounts of dust*

|  | Per Cent Dust | Gravity Test |
|---|---|---|
| Bauxite | 0 | 77 |
| Do | 5 | 77 |
| Do | 10 | 60 |
| Do | 15 | 62 |
| Do | 20 | 72 |
| Do | 25 | 77 |
| Do | 30 | 82 |
| Do | 100 | 88 |

As shown in the table, the adsorptive efficiency of the bauxite or the dust (last horizontal column), respectively, is expressed in terms of gravity test. The term "gravity test" of a particular adsorbent material, as developed by one of us to express adsorptive efficiency of such material, connotes, with the omission of decimals, the difference between the respective specific gravities of the hydrocarbon material to be refined before and after its filtration through the adsorbent. Since for a successful percolation treatment a dust content in excess of 15 per cent and preferably in excess of 10 per cent is undesirable, and since up to 10 per cent of dust content constitutes an impairment of the adsorptive efficiency of the filter material, it is requisite for efficient percolation operations to remove substantially all of the dust including the portion adhering to the coarser particles.

We have discovered that the attractive power of the bauxite for its own dust varies with certain temperatures and that a temperature range of minimum attraction exists within which the attractively adhering bauxite dust may be removed from the bauxite by suitable means, such as a blast or current of air or other suitable gas. This temperature range of minimum attraction of bauxite for bauxite dust lies between 500 and 1600° F., and preferably between 600 and 1200° F. When blowing air over or through the bauxite within this temperature range and preferably in counter-current fashion, the attractively adhering bauxite dust is substantially completely removed, and we have termed and will hereafter refer to such temperature ranges as the "effective dedusting temperature range" of the bauxite. For the purpose of preventing the cooling of the bauxite to below the effective dedusting temperature range prior to the substantially complete removal of attracted dust, we prefer to preheat the air before blowing the same over or through the bauxite, and have found that best results and a substantially dust-free bauxite are obtained by not only maintaining the bauxite within the effective dedusting temperature range but also passing the air over or through the bauxite after the air has been heated to a temperature of at least 120° F., and preferably of at least 220° F. The current or blast of air or other suitable gas passing over or through the bauxite should have a velocity sufficient to remove the dust particles from the bauxite while the same is within the effective dedusting temperature range. With air velocities of from 4 to 6 feet per second, and a preferred velocity of 5 feet per second, satisfactory results are obtained.

The conditioning of bauxite in accordance with our invention is preferably carried out in the following manner: The bauxite ore is first roasted in accordance with conventional practice by heating the same in a suitable furnace or kiln, such as a Herreshoff type furnace, a rotary kiln, a vertical stationary furnace, or the like, to a temperature of from 600 to 1600° F., and preferably to a temperature of from 1000 to 1200° F. Assuming that a multi-hearth Herreshoff furnace is being used, heat is applied to the various hearths preferably in such manner that the temperature of the ore on each hearth is raised by suitable increments (80° F. to 100° F. in the case of a 12-hearth furnace) until the desired temperature is reached on the last hearth. During the roasting operation sufficient air is admitted to maintain good oxidizing conditions in all parts of the furnace at all times, the throughput being preferably regulated in such manner that not more than approximately a 2-inch layer of the ore is carried by the hearth arms, which may be rotated, for example, at a speed of approximately 6 revolutions per minute.

Following the roasting operation the calcined bauxite is next subjected to the dedusting treatment which is preferably carried out in a closed receptacle through which a stream of hot bauxite is passed either in a vertical column by means of gravity, as for instance in cascade fashion or, horizontally by means of conveyors, being met in its travel and while its temperature is within the effective dedusting temperature range of from 500 to 1600° F., by an air current (preferably preheated) of a velocity of from 4 to 6 feet per second, and preferably of 5 feet per second. The effective dedusting temperature range is best maintained by passing the bauxite into the receptacle which may be, for example, a cascade tower of about 30 feet in height, at a temperature as near as possible to the preferred upper limit of the effective dedusting temperature, i. e., 1200° F., or at a slightly higher temperature. The air or other suitable gas is passed countercurrently over or through the bauxite in such manner that, at the point of first contact of the stream of air with the bauxite, and while the bauxite is still within the effective dedusting temperature range, the air is at a temperature preferably of from 120 to 220° F., and at the point of last contact with the bauxite, i. e., at the bauxite feed end of the receptacle, the air is at a temperature of at least 200° F., and preferably of at least 250° F. The dust carried away by the countercurrent stream or blast of air or other suitable gas is precipitated and discharged into a storage bin or tank or, if desired, directly into one or more filter towers.

The changes effected in a bauxite subjected to treatment in the afore-described manner are illustrated by the following Tables II and III. Table II shows the average mesh content of an original ore and that of the activated material, while Table III illustrates the change in composition resulting from the treatment.

TABLE II

| Mesh | Bauxite Ore, Per Cent | Activated Bauxite, Per Cent |
| --- | --- | --- |
| On 30 | 35 | 30 |
| On 40 | 35 | 40 |
| On 60 | 25 | 27 |
| On 80 | 3 | 3 |
| Through 80 | 2 | traces |

TABLE III

| | Bauxite Ore, Per Cent | Activated Bauxite, Per Cent |
| --- | --- | --- |
| Moisture Loss @ 110° C | 1.0 | |
| Combined Water | 29.0 | 1.5 |
| Soluble Alumina as $Al_2O_3$ | 56.0 | 80.0 |
| Soluble Iron as $Fe_2O_3$ | 5.0 | 6.0 |
| Soluble Titanium as $TiO_2$ | 1.0 | 1.0 |
| Insoluble Residue | 8.0 | 11.5 |

From Table II it will be noted that while the treatment results in a general diminution of particle size the percentage of particles finer than 80 mesh is reduced to mere traces.

The superiority in oil treatment operations of bauxite which has been treated according to the invention is illustrated by the following examples:

EXAMPLE I

A Pennsylvania neutral oil having a specific gravity of .8620 was percolated through bauxite activated in accordance with prior practice and containing 1.1–10 per cent of dust attractively adhering thereto, and through a substantially dust-free bauxite prepared in the afore-indicated manner. The loss in specific gravity which as indicated hereinbefore is a measure of the adsorptive efficiency of an adsorbent was greatest in the case of a dust-free material. The results of the tests are summarized in the table below:

TABLE IV

| Per Cent Dust | Specific Gravity | Gravity Test Number |
| --- | --- | --- |
| 0 | .8500 | 120 |
| 1.1 | .8504 | 116 |
| 2.7 | .8515 | 105 |
| 3.1 | .8512 | 108 |
| 3.8 | .8512 | 108 |
| 4.5 | .8546 | 74 |
| 6 | .8551 | 69 |
| 8 | .8557 | 63 |
| 10 | .8558 | 62 |

The second column of the table shows the respective gravities of the stock after filtration through bauxite containing dust in the amounts indicated in the first column, while the third column shows the respective gravity test numbers.

EXAMPLE II

A Midcontinent Bright Stock was respectively percolated through a bauxite activated and dedusted in accordance with our invention and through a bauxite activated without removal of adhering dust particles, at a temperature of 250° F., and under atmospheric pressure. The respective bauxites possessed the following characteristics:

| | Dust, Per Cent | Gravity Test | Screen Analysis on— | | | |
| --- | --- | --- | --- | --- | --- | --- |
| | | | 30 | 40 | 60 | 80 |
| Activated dedusted Bauxite | 0 | 108 | Per cent 50 | Per cent 25 | Per cent 23 | Per cent 2 |
| Activated Bauxite, dust retained | 4.0 | 94 | 49 | 23 | 22 | 2 |

A comparative analysis of the qualities of the aforementioned stock before and after filtration through the respective bauxites is given in the following table:

TABLE V

| | Original | Filtered through Activated Dedusted Bauxite | Filtered through Activated Undedusted Bauxite |
| --- | --- | --- | --- |
| Gravity ° API | 20.7 | 24.1 | 23.8 |
| Vis./210° F | 185 | 162 | 163 |
| Vis./100° F | 5,200 | 3,500 | 3,600 |
| Vis. Index | 68 | 75 | 73 |
| Carbon Test per cent | 3.4 | 1.9 | 2.1 |

EXAMPLE III

A Pennsylvania Bright Stock was percolated respectively through a bauxite stabilized in accordance with our invention and through a bauxite activated without stabilization and removal of adhering dust particles at a temperature of 250° F., and at atmospheric pressure. The respective bauxites possessed the following characteristics:

| | Dust | $Fe_2O_3$ | Gravity Test | Screen Analysis on— | | | |
| --- | --- | --- | --- | --- | --- | --- | --- |
| | | | | 30 | 40 | 60 | 80 |
| Stabilized Bauxite | Per Cent | Per Cent 1 | 115 | 29 | 40 | 28 | 3 |
| Activated Unstabilized Bauxite | 2 | 6.0 | 93 | 30 | 40 | 27 | 3 |

The following table shows a comparative analysis of the properties of the stock before and after filtration through the respective bauxites:

TABLE VI

|  | Original | Filtered through Unstabilized Activated Bauxite | Filtered through Activated Bauxite Stabilized |
|---|---|---|---|
| Gravity _____°API__ | 25.8 | 27.3 | 28.2 |
| Vis./210° F _____ | 150 | 136 | 132 |
| Vis./100° F _____ | 2,410 | 1,910 | 1,700 |
| Vis. Index _____ | 99.4 | 104.2 | 108 |
| Per Cent Carbon_____ | 2.20 | 1.10 | 0.6 |

When the adsorptive efficiency of bauxite has been exhausted through continued use in the treatment of oil, the same need not be discarded but may be reactivated. The reactivation may be conducted with or without the prior removal of retained hydrocarbons by means of suitable solvents such as naphtha, by roasting the bauxite at an elevated temperature, and preferably between 600° and 1600° F., whereby the adsorbed organic matter is carbonized and substantially completely removed by maintaining an oxidizing atmosphere in the furnace or kiln during the roasting operation. This reactivation or regeneration of the bauxite and its subsequent re-use as an adsorbent refining material may be carried out repetitiously.

Just as in the initial activation of raw bauxite, the reactivation of partially or completely spent bauxite is accompanied by the formation of considerable quantities of dust, a part of which may be of adherent character. The amount of dust formed will be less if the reactivation treatment has been preceded by the removal of retained hydrocarbons, the presence of which appears to contribute to the friability of the bauxite under the conditions of the reactivation treatment. In any event it is highly desirable that the adherent dust as well as the non-adherent dust be removed from the reactivated material for the reasons previously given. This may be readily accomplished by the method described herein.

The term "activated bauxite" as used in the appended claims encompasses reactivated or regenerated bauxite as well as bauxite which has been subjected to only a single activation treatment.

We claim:

1. A process which comprises contacting activated bauxite predominating in particles of a particle size within the range of 20 to 80 mesh at a temperature of from 1000° F. to 1200° F. with a current of preheated air having a velocity of from 4 to 6 feet per second to substantially free said particles of adherent relatively finer particles inseparable therefrom by screening, said air being at a temperature of from 120° F. to 220° F. at the point of first contact with said bauxite and at a temperature of from 200° F. to 250° F. at the point of last contact with said bauxite.

2. A process which comprises contacting activated bauxite predominating in particles of a particle size within the range of 20 to 80 mesh at a temperature of from 1000° F. to 1200° F. with a current of preheated air having a velocity of from 4 to 6 feet per second to substantially free said particles of adherent relatively finer particles inseparable therefrom by screening.

3. A process which comprises contacting activated bauxite predominating in particles of a particle size within the range of 20 to 80 mesh at a temperature of from 1000° F. to 1200° F. with a current of preheated air having a velocity of from 4 to 6 feet per second to substantially free said particles of adherent relatively finer particles inseparable therefrom by screening, said air being preheated to a temperature between 120° F. and 220° F. prior to contacting with the bauxite.

4. A process which comprises contacting activated bauxite predominating in particles of a particle size within the range of 20 to 80 mesh at a temperature of from 500° F. to 1600° F. with a current of preheated air having a velocity of from 4 to 6 feet per second to substantially free said particles of adherent relatively finer particles inseparable therefrom by screening, said air being preheated to a temperature between 120° F. and 220° F. prior to contacting with the bauxite.

FERDINAND W. BRETH.
ANTHONY KINSEL.

REFERENCES CITED

The following references are of record in the file of this patent:

UNITED STATES PATENTS

| Number | Name | Date |
|---|---|---|
| 2,006,693 | Hechenbleikner | July 2, 1935 |
| 2,107,215 | Rembert | Feb. 1, 1938 |
| 2,016,271 | Buell et al. | Oct. 8, 1935 |
| 2,160,874 | Kinsel | June 6, 1939 |

FOREIGN PATENTS

| Number | Country | Date |
|---|---|---|
| 236,263 | Great Britain | June 29, 1925 |
| 416,711 | Great Britain | Sept. 13, 1934 |

OTHER REFERENCES

Shaw, "Air Separation Methods used in Fine Grinding of Rock Products," pp. 25–26. Reprint from Rock Products for Oct. 15, 1927.

Berrisford et al., "Pneumatic De-dusting of coal," Transactions of the Institution of Mining Engineers, London, vol. 89, p. 328, Sept., 1935.